(12) United States Patent
Ives et al.

(10) Patent No.: US 11,424,642 B2
(45) Date of Patent: Aug. 23, 2022

(54) SOLID SWITCH POWER DISTRIBUTION CONTROLLER WITH STORAGE DEVICE BACKUP

(71) Applicant: Hamilton Sundstrand Corporation, Charlotte, NC (US)

(72) Inventors: Kyle Stephen Ives, Loves Park, IL (US); David M. Kucharski, Delavan, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 29 days.

(21) Appl. No.: 16/361,671

(22) Filed: Mar. 22, 2019

(65) Prior Publication Data

US 2020/0303947 A1    Sep. 24, 2020

(51) Int. Cl.
*H02J 9/06* (2006.01)
*B64D 47/00* (2006.01)

(52) U.S. Cl.
CPC .............. *H02J 9/061* (2013.01); *B64D 47/00* (2013.01); *B64D 2221/00* (2013.01); *H02J 9/068* (2020.01)

(58) Field of Classification Search
CPC ...................................................... H02J 9/061
See application file for complete search history.

(56) References Cited

U.S. PATENT DOCUMENTS

| | | | |
|---|---|---|---|
| 5,455,731 A | 10/1995 | Parkinson | |
| 5,752,047 A | 5/1998 | Darty et al. | |
| 6,865,690 B2 | 3/2005 | Kocin | |
| 7,573,396 B2 | 8/2009 | Stokes | |
| 7,622,818 B2 | 11/2009 | Ausman et al. | |
| 8,148,848 B2 | 4/2012 | Rusan et al. | |
| 8,704,574 B2 | 4/2014 | Prabhuk et al. | |
| 8,941,265 B2 | 1/2015 | Oldenburg et al. | |
| 9,660,446 B2 | 5/2017 | Toothman et al. | |
| 9,676,351 B2 | 6/2017 | Shander et al. | |
| 9,789,973 B2 | 10/2017 | Swearingen et al. | |
| 10,128,662 B2 | 11/2018 | Radun et al. | |
| 2014/0197681 A1* | 7/2014 | Iwashima | B60L 53/53 307/9.1 |
| 2016/0043596 A1 | 2/2016 | Yamaguchi et al. | |
| 2018/0145498 A1* | 5/2018 | Handy | H02H 3/08 |
| 2018/0155044 A1 | 6/2018 | Halsey et al. | |
| 2018/0233923 A1 | 8/2018 | Compton et al. | |
| 2019/0079548 A1* | 3/2019 | Buffenbarger | G05F 1/46 |

OTHER PUBLICATIONS

European Search Report for European Application No. 19212424.6, Application Filing Date Nov. 29, 2019; dated Mar. 6, 2020 (7 pages).

* cited by examiner

*Primary Examiner* — Daniel Kessie

(74) *Attorney, Agent, or Firm* — Cantor Colburn LLP

(57) ABSTRACT

A power distribution controller includes a solid state power controller (SSPC), a power system, and a backup power system. The SSPC is configured to selectively deliver a first power from a first power source to at least one electrical load. The power system is in signal communication with the at least one SSPC. The backup power system includes a first output in signal communication with the SSPC and a second output in signal communication with the power system.

16 Claims, 3 Drawing Sheets

SOLID SWITCH POWER DISTRIBUTION CONTROLLER WITH STORAGE DEVICE BACKUP

TECHNICAL FIELD

The subject matter disclosed herein relates generally to power systems, and more particularly, to an aircraft power distribution system.

BACKGROUND

Aircraft vehicles implement power distribution systems, which include a multitude of individual circuits and components installed remotely throughout the vehicle. The power distribution systems control the delivery of power to one or more loads such as, for example, controllers, radios, heaters, etc. Certain loads can be effected or their operation can be interrupted (e.g., reset, shutdown, etc.) if their input power is interrupted. These power interruptions are typically avoided by placing the loads on essential buses which are backed up by an emergency power supply. However, the amount of loads that can be installed on these emergency buses are limited. Further, although these emergency buses may avoid power interruption, they do so while consuming essential power feeds that may be required to power other systems of the vehicle.

BRIEF DESCRIPTION

According to a non-limiting embodiment of the invention, a power distribution controller includes one or more solid state power controllers (SSPCs), a power system, and a backup power system. The SSPC is configured to selectively deliver a first power from a first power source to at least one electrical load. The power system is in signal communication with the at least one SSPC. The backup power system includes a first output in signal communication with the SSPC and a second output in signal communication with the power system.

According to another non-limiting embodiment, a method of controlling power to an electrical load comprises delivering a first power, via a first power source, to at least one solid state power controller (SSPC) that selectively outputs power to the electrical load. The method further comprises generating an operating power signal, via the power system, to drive the at least one SSPC. The method further comprises inputting a portion of the first power to a backup power system in response to invoking a first operating mode, and outputting a first backup power to the at least one SSPC, via the backup power system, in response to invoking a second operating mode.

In addition to one or more of the features described above, or as an alternative, further embodiments may include Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
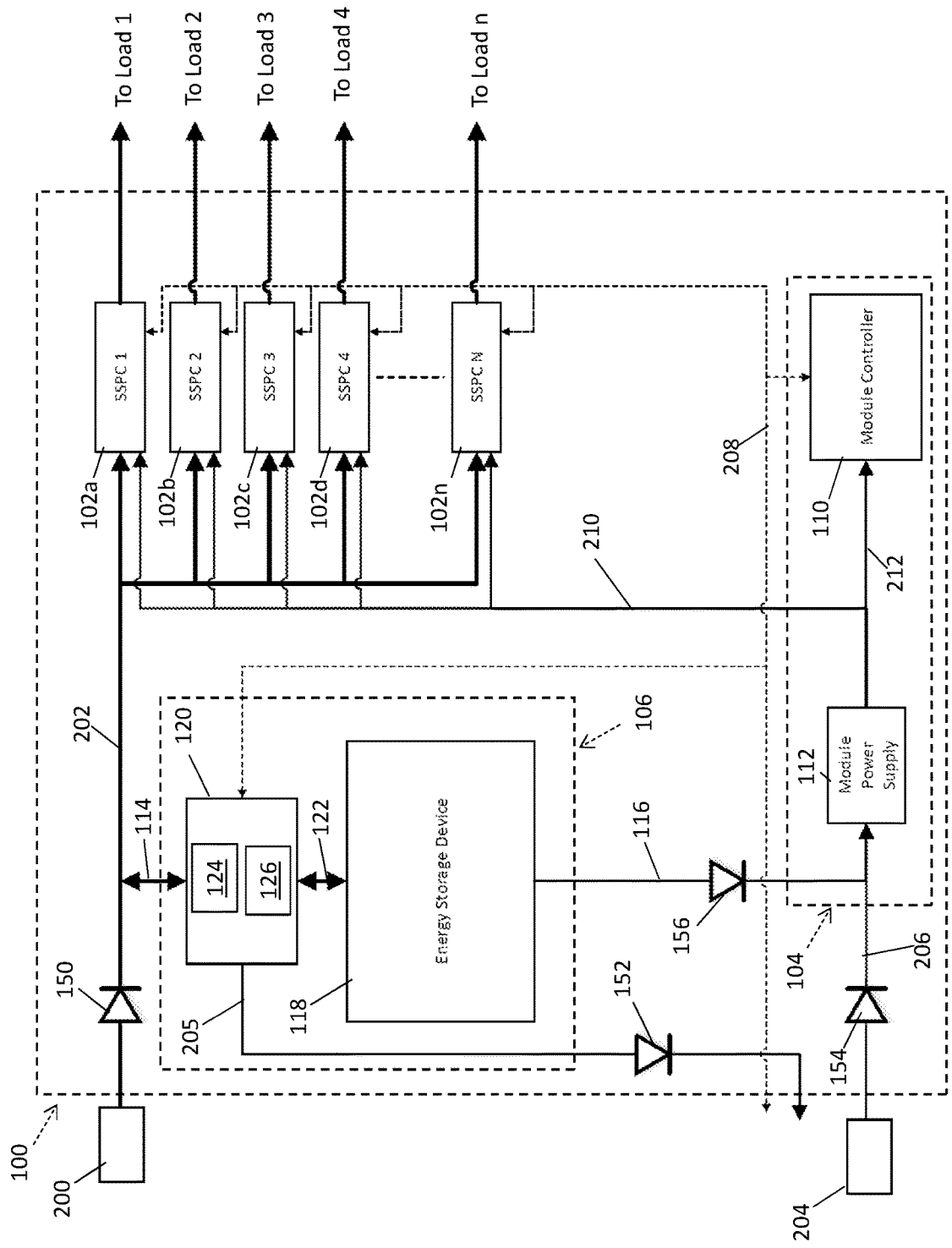
FIG. 1 is a block diagram illustrating a power distribution controller according to a non-limiting embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Turning now to descriptions that are more relevant to the present teachings, solid state power controllers (SSPCs) are used in aircraft power distribution systems as an alternative to traditional electromechanical circuit breakers. An SSPC utilizes one or more solid state switches that are driven by an operating power signal to protect and/or distribute power to electrical loads installed on the vehicle. SSPCs have many advantages over traditional electromechanical protection devices including switch speed, reliability, and switch performance Additionally they facilitate advanced protection and diagnostics, allowing for efficient power distribution architectures and packaging techniques including additional features such as what is being described herein Various non-limiting embodiments of the present teachings provide a power distribution controller which implements a SSPC controller and one or more solid state power controllers (SSPCs). The SSPC controller controls the operation of the SSPCs, which are configured to connect an aircraft power feed (e.g., high-current power signals) to individual loads. Unlike conventional power distribution systems, the power distribution controller integrates a backup power system, one or more SSPCs, and an SSPC controller as a single unit or single hardware controller with an integrated rechargeable energy device (e.g., a battery, supercapacitor, etc.) and backup controller. The backup power system recharges the energy storage device when the aircraft power feed is operating normally (i.e., when operating without interruption). When an interruption in the power feed occurs, power delivered by the individual SSPCs is maintained using the rechargeable energy storage device.

The SSPC controller is powered using a low-voltage power source, which is separate from the high-current aircraft feed. In at least one non-limiting embodiment, the rechargeable energy storage device is also capable of providing backup power to the SSPC controller if the low-voltage power source is interrupted and/or lost.

With reference now to FIG. 1, a power distribution controller 100 is illustrated according to a non-limiting embodiment. The power distribution controller 100 includes one or more solid state power controllers (SSPCs) 102a, 102b, 102c, 102d, 102n, a power system 104, and a backup power system 106. Any one of the SSPCs 102a-102n, the power system 104, and the backup power system 106 can be constructed as an electronic hardware controller that includes memory and a processor configured to execute algorithms and computer-readable program instructions stored in the memory. In addition, the power distribution controller 100 can integrate each of the SSPCs 102a-102n, the power system 104, and the backup power system 106 in a single module, i.e., a single hardware controller.

The power distribution controller 100 is connected to a first power source 200 and a second power source 204. The first power source 200 includes, for example, a high-current aircraft power feed 200 that generates a first power 202. The first power 202 can have a voltage ranging, for example, from an abnormally low voltage on an aircraft (typically about 18 volts on a standard DC system) to an abnormally high voltage (typically about 32 volts on a standard DC system). According to one or more embodiments, the system can be designed to support multiple different system voltages however with the energy storage and conversion system in 120 converting and controlling the voltage form the battery as needed to suit the aircraft system needs.

The second power source 204 includes, for example, a low power source 204 that generates a second power 206. The second power 204 can provide similar voltage ranges as that of the first power source 202 or could be a dedicated control source. Regardless the voltage range for this source would also range from an abnormally low voltage to an abnormally high voltage similar to the ranges previously described.

The SSPCs 102a-102n are configured to selectively deliver power from the aircraft power feed 200 and/or backup power provided by the backup power system 106 to one or more electrical loads. In one or more embodiments, the SSPCs 102a-102n can operate as a combined relay and circuit breaker to facilitate load control and wire protection. Each SSPC 102a-102n employs one or more solid state switches (not shown) that are selectively activated or deactivated to deliver or inhibit power from the aircraft power feed 200 to the loads. The solid state switches are driven by an operating power signal 210 that is generated by the power system 104, which is described in greater detail below.

The power system 104 is in signal communication with the low power source 204, the backup power system 106, and the SSPCs 102a-102n. The power system 104 includes an SSPC controller 110 and a power supply 112. The SSPC controller 110 is in signal communication with the SSPCs 102a-102n and the backup power system 106. The SSPC controller 110 operates independently of the first power 202 and is configured to output a logic control signal 208 that selectively operates the SSPCs 102a-102n in an open state and a closed state. When operating in the open state, a given SSPC delivers the first power and or the backup power to an electrical load. When operating in the closed state, a given SSPC inhibits (i.e., blocks) the first power or the backup power from the electrical load.

The power supply 112 includes an input in signal communication with each of the low power source 204 and the backup power system 106. The power supply 112 is configured to receive the second power 206 from the low power source 204 and/or the stored energy from the backup power supply 106. In either scenario, the power supply 112 converts the second power 206 and the stored energy from the backup power supply 106 into an operating power signal that powers the SSPCs 102a-102 and/or the SSPC controller 110. Diode 154 can be connected between the low power source 204 and the backup power system 106 to prevent uncontrolled backfeed of power from the backup power system 106 to the lower power source 204, and avoid rapid energy drain from the backup power system 106.

The backup power system 106 includes a first output 114 in signal communication with the aircraft power feed 200 and the SSPCs 102a-102n, and a second output 116 in signal communication with the power system 104. In one or more embodiments, the backup power system 106 includes an energy storage device 118 and an energy device control system 120. Accordingly, the backup power system 106 is configured to selectively input the first power 202 in response to operating in a first mode, and to output backup power to one or more of the SSPCs 102a-102n in response to operating in a second mode. Diode 150 can be connected between the aircraft power feed 200 and the backup power system 106. In this manner, rapid drain of the energy stored by the backup power system 106 can be avoided because the diode 150 blocks the backup power system 106 from delivering power to the main power feed the aircraft power feed 200.

In one or more embodiments, the backup power system 106 can implement a power converter (not shown) that converts the energy discharged from the energy storage device 118 into the backup power that is delivered to the SSPCs 102a-102n. In one or more embodiments, the backup power system 106 can also generate an auxiliary power signal 205. The auxiliary power signal 205 can be fed back the remaining aircraft system to power one or more auxiliary microprocessors and/or electrical systems. Diode 152 can be connected between the backup power system 106 and the remaining aircraft system. Accordingly, diode 152 can prevent uncontrolled backfeed of power from the rest of the system to flow directly to the backup power system 106, thereby avoiding potential damage to the backup power system or other components of the power distribution controller 100.

The energy storage device 118 includes, but is not limited to, a rechargeable battery, a supercapacitor, or another type of energy storage device. Accordingly, the energy storage device 118 is configured to store energy in response to receiving the first power 202 from the aircraft power feed 200.

The energy device control system 120 is configured to monitor the aircraft power feed 200, in addition to other system modules, and the SSPCs 102a-102n via the first output 114, and is connected to the energy storage device via connection 122. Connection 122 can be a bidirectional connection that facilities the input of the first power 202 generated by the aircraft power feed and the output of energy stored by the energy storage device 118

In one or more embodiments, the energy device control system 120 includes a backup power controller 124 and an energy device charger 126. The backup power controller 124 is configured to invoke the first mode and the second mode based on a power level of the first power 202. For example, the backup power controller 124 can monitor the power level of the first power 202, and can invoke the second mode in response to the power level of the first power 202 being less than a first threshold. The energy device charger 126 is configured to recharge the energy storage device 118 using the first power 202 in response to being activated.

In one or more embodiments, the backup power controller 124 is configured to activate the energy device charger 126 to recharge the energy storage device 118 in response to invoking the first mode. The backup power controller 124 is also configured to discharge the stored energy from the energy storage device 118 to generate the backup power in response to invoking the second mode. For example, the backup power can be delivered to one or more of the SSPCs 102a-102n, and in turn a given SSPC can selectively output the backup power to an electrical load.

The backup power controller 124 can also discharge energy from the energy storage device 118 to the power supply 112. In one or more embodiments, the backup power controller 124 discharges the stored energy to the power supply 112 in response to determining that the power level of the second power 206 is below a threshold (e.g., a voltage threshold). A sensor can be installed that outputs a signal to the backup power controller 124 that indicates the power level of the second power 206.

In one example, the SSPC controller 110 can determine that the power level output from the power supply 112 is below the threshold, and in response can generate a backup power request signal to the backup power controller 124. In response to receiving the backup power request signal, the backup power controller 124 can discharge the energy from the energy storage device 118. The power supply 112 can then convert the discharged energy into backup power, which can power the SSPCs 102a-102n and the SSPC controller 110. Diode 156 can be connected between the energy storage device 118 and the node connected to the low power source 204 and power supply 112 to prevent backfeed power discharge from the energy power supply 112.

Figure 2:
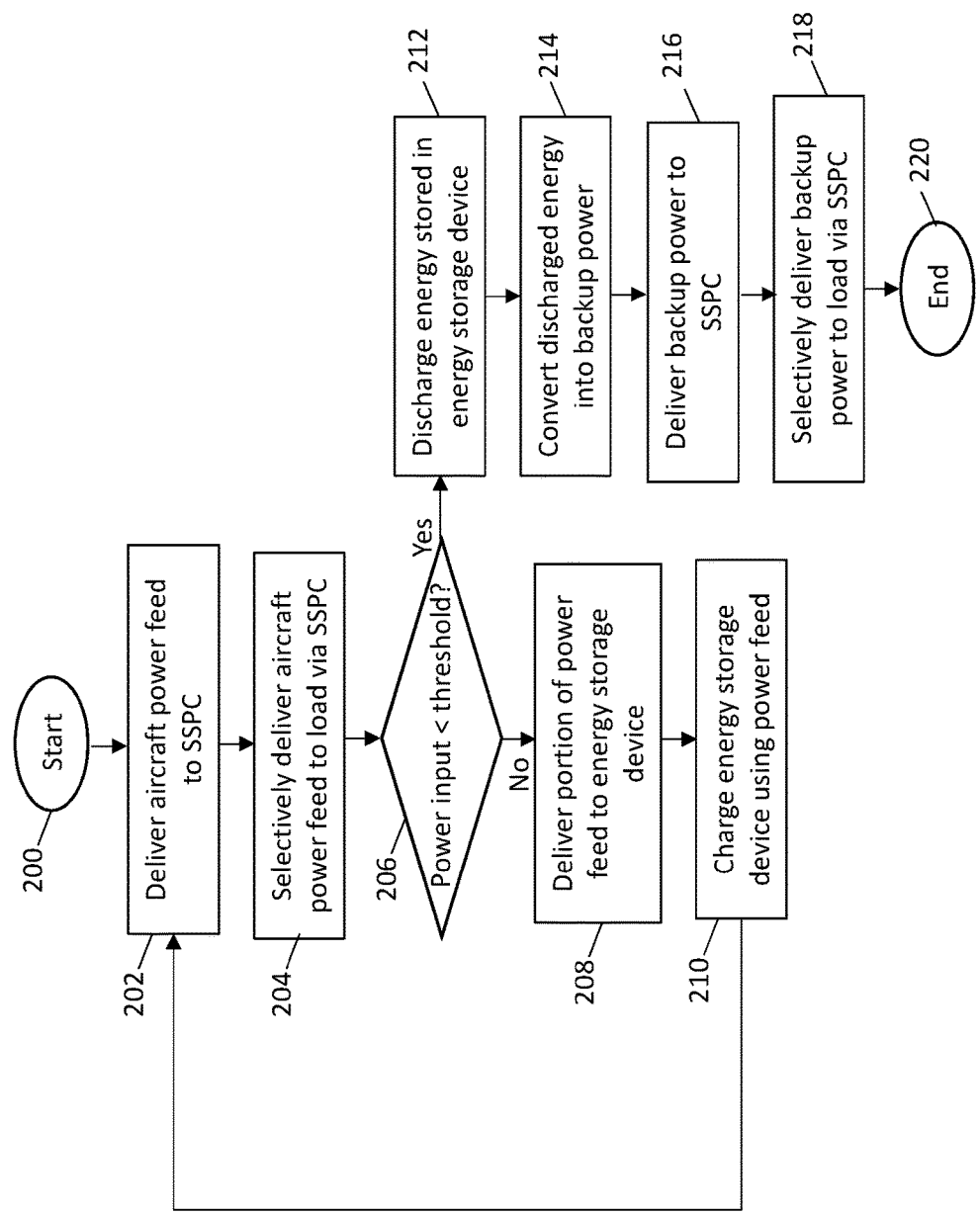
FIG. 2 is a flow diagram illustrating a method of distributing power to one or more loads according to a non-limiting embodiment.

Turning to FIG. 2, a flow diagram illustrates a method of distributing power to one or more loads according to a non-limiting embodiment. The method begins at operation 200, and at operation 202 aircraft power feed is delivered to one or more SSPCs. At operation 204, a given SSPC selectively delivers the aircraft power feed to one or more electrical loads. At operation 206, a determination is made as to whether the aircraft power feed is less than a threshold (e.g., a voltage threshold). When the aircraft power feed is not below the threshold, a portion of the aircraft power feed is delivered to a backup power system at operation 208. At operation 210, the backup power system charges an energy storage device, and the system continues delivering the aircraft power feed to the SSPCs at operation 202.

When, however, the aircraft power feed is below the threshold, energy is discharged from the energy storage device at operation 212. At operation 214, the backup power system converts the discharged energy into backup power. At operation 216, the backup power is delivered to one or more of the SSPCs. At operation 218 one or more of the SSPCs selectively deliver to the backup power to one or more electrical loads, and the method ends at operation 220.

Figure 3:
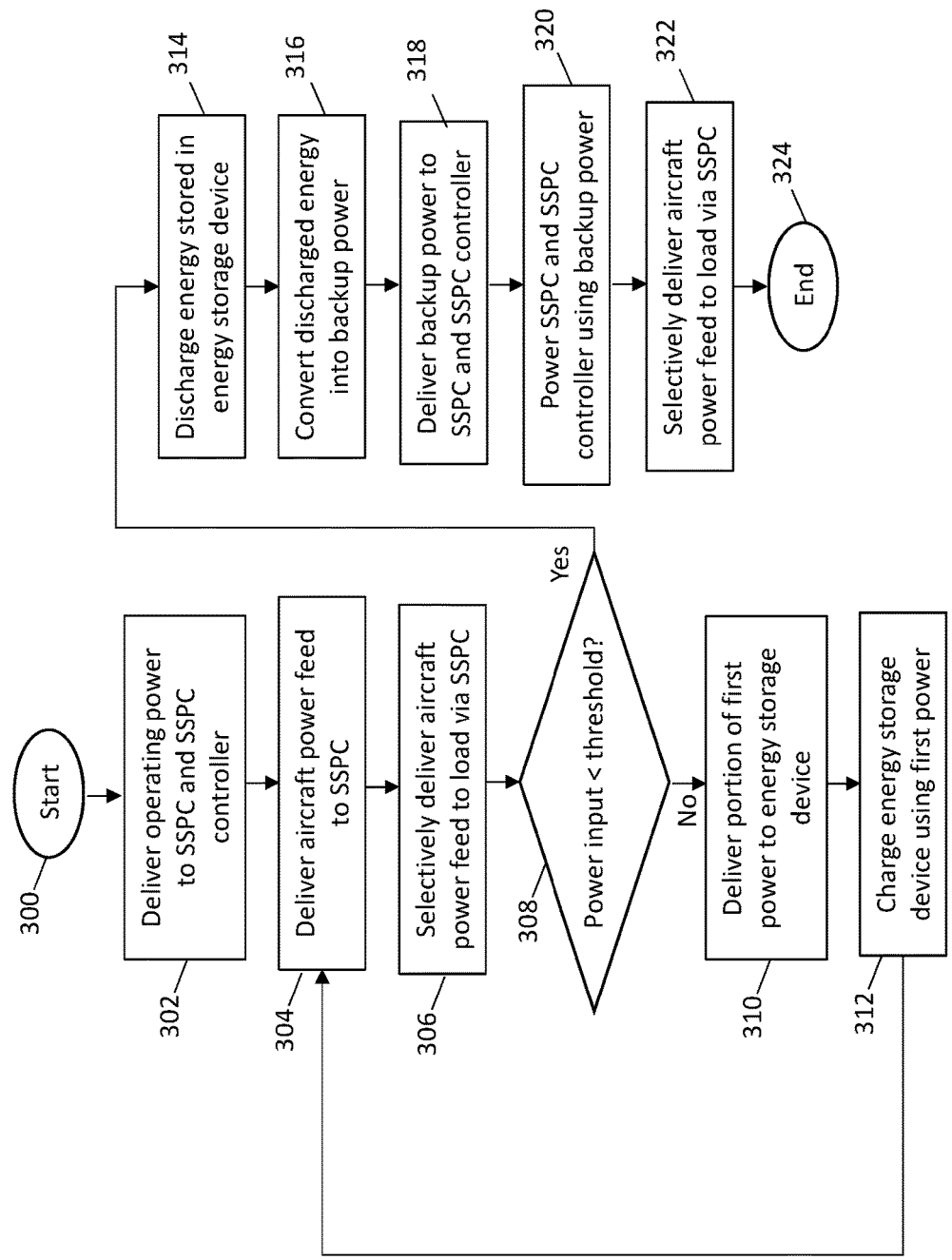
FIG. 3 is a flow diagram illustrating a method of distributing power to one or more loads according to a non-limiting embodiment.

With reference to FIG. 3, a flow diagram illustrates a method of distributing power to one or more loads according to a non-limiting embodiment. The method begins at operation 300, operating power is delivered to an SSPC controller and one or more SSPCs at operation 302. At operation 304, an aircraft power feed is delivered to the SSPCs. At operation 306, the SSPCs selectively deliver the aircraft power feed to one or more electrical loads. At operation 308, a determination is made as to whether the operating power is less than a threshold (e.g., a voltage threshold). When the operating power is not less than the threshold, a portion of the aircraft power feed is delivered to a backup power system at operation 310. At operation 312, the backup power system charges an energy storage device, and the system continues delivering the aircraft power feed to the SSPCs at operation 304.

When, however, the aircraft power feed is below the desired threshold, energy, and other contextual data is available (such as energy storage device temperature, system configuration, etc.) is discharged from the energy storage device at operation 314. At operation 316, the discharged energy is converted into backup power. At operation 318, the backup power is delivered to an SSPC controller and one or more of the SSPCs. At operation 320 the SSPC controller and the SSPCs are powered using the backup power. At operation 322, the aircraft power feed is selectively delivered to one or more electrical loads via the SSPCs, and the method ends at operation 324.

As described herein various non-limiting embodiments provide a power distribution controller that integrates a backup power system, one or more SSPCs, and an SSPC controller as a single unit or single hardware controller. The backup power system includes a rechargeable energy device (e.g., a battery, supercapacitor, etc.) and backup controller. The backup power system recharges the energy storage device when the aircraft power feed is operating normally (i.e., when operating without interruption). When an interruption in the power feed occurs, power delivered by the individual SSPCs is maintained using the rechargeable energy storage device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A power distribution controller comprising: at least one solid state power controller (SSPC) configured to selectively deliver a first power from a first power source to at least one electrical load; a power system in signal communication with the at least one SSPC, and a backup power system including a first output in signal communication with the at least one SSPC and a second output in signal communication with the power system, wherein the backup power system is configured to selectively discharge energy to the power system, and the power system converts the discharged energy into backup power that is delivered to the at least one SSPC, wherein the backup power system comprises: an energy storage device configured to store the energy in response to receiving the first power from the first power source; and an energy device control system including a first signal connection with the energy storage device, and a second signal connection with each of the first power source and the at least one SSPC, the energy device control system configured to invoke the first mode and the second mode,
wherein the backup power system is in signal communication with the first power source, and is configured to selectively input the first power in response to operating in a first mode and to output a first backup power to the at least one SSPC in response to operating in a second modes wherein the SSPC is configured to deliver the backup power received directly from the first output to the at least one electrical load, wherein the first output is a bidirectional output that is connected directly between the energy storage device and the energy device control system; and wherein the second output is separated from the first output and is connected directly between the energy storage device and the power system.

2. The power distribution controller of claim 1, wherein the backup power system invokes the second mode in response to determining the first power is less than a first threshold.

3. The power distribution controller of claim 2, wherein the power system outputs a second power to at least one of SSPC controller and the at least one SSPC.

4. The power distribution controller of claim 1, wherein the energy device control system controls the energy storage device to discharge the energy from the energy storage device in response to determining the second power is below a second threshold.

5. The power distribution controller of claim 4, wherein the energy device control system comprises:
a backup power controller in signal communication with the first power source and the at least one SSPC; and
an energy device charger configured to recharge the energy storage device using the first power in response to being activated.

6. The power distribution controller of claim 5, wherein the backup power controller is configured to activate the energy device charger to recharge the energy storage device in response to invoking the first mode.

7. The power distribution controller of claim 6, wherein the power system is configured to selectively convert the second power into a third power signal in response to operating in a first operating mode, and to convert the stored energy into a fourth power signal in response to operating in a second operating mode, at least one of the third and fourth power signals configured to power the at least one SSPC and the SSPC controller.

8. A method of controlling power to an electrical load, the method comprising: delivering a first power, via a first power source, to at least one solid state power controller (SSPC) that selectively outputs power to the electrical load; generating an operating power signal, via the power system, to drive the at least one SSPC, and inputting a portion of the first power to a backup power system in response to invoking a first operating mode, and outputting a first backup power to the at least one SSPC, via the backup power system, in response to invoking a second operating mode, wherein outputting the first backup power comprises: selectively discharging stored energy from the backup power system to the power system; and converting, via the power system, the discharged energy into a second backup power and delivering the backup power from the first output directly to the SSPC; and delivering, via the SSPC, the backup power received directly from the first output to the at least one electrical load, wherein the first output is a bidirectional output that is connected directly between the energy storage device and the energy device control system; and wherein the second output is separated from the first output and is connected directly between the energy storage device and the power system.

9. The method of claim 8, further comprising invoking the second operating mode in response to determining the first power is less than a first threshold.

10. The method of claim 9, wherein inputting the first power to the backup power system further comprises storing the energy in an energy storage device configured in response to determining the first power being great or equal to the first threshold.

11. The method of claim 10, further comprising outputting, via the power system, the second backup power to at least one of SSPC controller and the at least one SSPC.

12. The method of claim 11, further comprising discharging the energy from the energy storage device in response to determining the second power is below a second threshold.

13. The method of claim 12, further comprising selectively converting, via the power system, the second power into the operating power signal in response to operating the power system in a first operating mode.

14. The method of claim 13, further comprising converting, via the power system, the energy discharged from the energy storage device into the second backup power in response to operating the power system in a second operating mode.

15. The method of claim 14, further comprising:
powering the at least one SSPC and the SSPC controller using the operating power signal while operating in the first operating mode; and
powering the at least one SSPC and the SSPC controller using the second backup power while operating in the second operating mode.

16. The method of claim 15, further comprising recharging the energy storage device, via the backup power system, while delivering the first power and the operating power to the at least one SSPC.

* * * * *